(12) United States Patent
Kolze

(10) Patent No.: US 6,290,203 B1
(45) Date of Patent: Sep. 18, 2001

(54) PILOT OPERATED VALVE ASSEMBLY

(75) Inventor: Lawrence A. Kolze, Seneca, SC (US)

(73) Assignee: Kolze, Inc., Seneca, SC (US)

( * ) Notice: Subject to any disclaimer, the term of this patent is extended or adjusted under 35 U.S.C. 154(b) by 0 days.

(21) Appl. No.: 09/484,510

(22) Filed: Jan. 18, 2000

(51) Int. Cl.[7] ................................................... F16K 31/12
(52) U.S. Cl. .................................. 251/30.03; 251/30.02; 251/45
(58) Field of Search ............................. 251/30.03, 30.02, 251/30.01, 25, 26, 28, 45

(56) References Cited

U.S. PATENT DOCUMENTS

| 3,439,895 | * | 4/1969 | Marandi ........................ 251/45 X |
| 3,672,627 | | 6/1972 | McCarty, Jr. et al. . |
| 4,283,040 | | 8/1981 | Kolze . |
| 4,502,661 | | 3/1985 | Swanson . |
| 4,531,547 | * | 7/1985 | Hadden ........................ 137/625.64 |
| 4,981,280 | * | 1/1991 | Brandenberg ................. 251/30.02 X |

* cited by examiner

Primary Examiner—Kevin Lee
(74) Attorney, Agent, or Firm—Flint & Kim, P.A.

(57) ABSTRACT

A pilot operated valve assembly having a pressure responsive valve member for opening and closing a main valve, the pilot valve actuator permits a very small operating force and a short actuation travel which is less than the stroke of the main valve member. Compactness and manufacturing economy is attained by the incorporation of an insert structure within a valve housing to facilitate the arrangement of pilot valve and bleed passages that operate the pressure responsive main valve member. Valve construction permits an axial in line arrangement of pilot valve actuator and main valve member to further achieve a compact valve size and to ease manufacturing assembly.

15 Claims, 3 Drawing Sheets

US 6,290,203 B1

PILOT OPERATED VALVE ASSEMBLY

FIELD OF THE INVENTION

This invention relates generally to valves for controlling the flow of fluids and relates specifically to valve assemblies where a pilot valve controls the opening and closing of a main valve.

BACKGROUND OF THE INVENTION

Valve assemblies having a pressure responsive main valve member operated by a low force, short travel pilot valve actuator are relatively well known in the art. A low force short travel actuator permits a valve of this type to be operated by a low wattage solenoid or by a magnetic latch type device. These are important aspects for a valve used in conjunction with the ever growing electronic control field where low wattage devices are always an advantage, or where a valve assembly may be adaptable to a magnetic latch type actuator for battery operation. Valves of the type described are commercially available in a number of configurations, but due to their more complicated structure, bulk, and high cost, have not gained a wide acceptance in the market place. It is therefore the primary object of this invention to provide a pilot operated valve assembly of simple construction, compactness, economical manufacturing cost and one that can operate with a low force, short travel pilot actuator and that by the foregoing stated criteria, would gain a greater acceptability over present types now available.

To meet the simplicity object, in one aspect the present invention was developed as an improvement over the construction of the valve described in U.S. Pat. No. 3,672,627 to W. R. McCarty, Jr. et al. Although the McCarty patent is of simple construction and operates with small actuation forces, it also needs a pilot actuator that requires a large actuator travel that limits its capability for achieving low operational power and for adaptability to magnetic latch operation. An attempt to reduce the power consumption of a long actuator travel pilot valve is described in U.S. Pat. No. 4,502,661 to Wesley S. Swanson. Although this valve operates at lower continuous power levels than that shown by McCarty, the long actuation stroke required at its initial energization requires a high power spike which in some applications could be undesirable. The added pole piece also adds a little more complexity over the McCarty valve, but still requires a similar lengthy stroke and thereby limits its adaptability to be an efficient magnetic latch type actuator. The valves shown by McCarty and Swanson are simple, compact, and economical to manufacture, but due to their large actuator travel requirements, do not meet the desired objects of the invention.

U.S. Pat. No. 4,283,040 to L. Kolze, describes a valve where the pilot valve actuator does provide the low force and short actuator travel requisite, is relatively compact, but is more complicated and costly to manufacture and thereby does not fully meet the present invention objectives. Other valves meeting the performance criteria of low force and short pilot actuator travel are those similar to that shown in FIG. 3 of this application, where the pilot actuator is offset from the pressure responsive main valve member. These valve designs are bulky, complex, and costly to manufacture. As shown in FIG. 3 which illustrates the prior art, location of the pilot valve spaced apart from the main valve creates a structure where pilot and bleed passages are difficult to economically fabricate and the need for special orientation to assemble asymmetrical parts adds to the cost. Also, these valves use seal gasketing that is not symmetrical and can cause some difficulty to obtain uniformity of gasket sealing pressure that could lead to seal leakage. The FIG. 3 valve utilizes the eccentric pilot location with respect to the pressure responsive main valve member to obtain a short pilot actuator travel over that required by the McCarty and Swanson valves, but at the expense of complexity, size, and cost. Thus, all the above valve assemblies described are deficient in some aspect of the objectives achieved by the present invention which will be more fully understood from the Summary of the Invention below and Detailed Description that follows.

SUMMARY OF THE INVENTION

A surprisingly unique and useful combination has been discovered and is provided by the present invention which is an improved structural arrangement of the elements of a valve assembly where a pressure responsive main valve member can be operated by a pilot actuator having a small actuation force and a small actuator travel. The valve assembly comprises an insert structure within a valve housing which incorporates therein the pressure responsive main valve member, the pilot actuator, and its associated pilot passages. This arrangement allows the valve to be made of component parts that can be economically fabricated and assembled into a very compact assembly. The valve structure utilizes symmetry of individual parts for assembly ease and allows the use of simple O-ring seals. The valve construction also offers flexibility to use either metal or plastic materials as any machining or molding of component parts can be accomplished at simple axially and right angle oriented production processes. Since the housing, insert, and pilot actuation components can be made circular, the valve construction permits a plastic spin weld assembly for added economy in manufacture.

In one aspect, the invention is a pilot operated pressure actuated valve assembly which comprises a housing having a main fluid passage with inlet and outlet passages. A main valve seating surface within said housing located between said inlet and outlet passages; a pressure responsive main valve member movable with respect to the housing from a closed position contacting said seating surface to an open position spaced apart from said seating surface to permit flow from the inlet to the outlet passage; an insert disposed within said housing, the space between the pressure responsive main valve member and said insert defining a pilot chamber in said insert, said insert having pilot passages therein communicating said inlet, said pilot chamber, and said outlet; means for biasing said pressure responsive main valve member to the closed position; means defining a pilot flow passage for communicating said inlet passage and said outlet passage; a pilot valve member movable between a closed position preventing fluid flow through said pilot flow passage and an open position permitting flow therethrough; means for biasing said pilot valve member to a closed position; and, means for moving said pilot valve member from the closed to the open position to permit fluid to flow through said pilot flow passage thereby causing a pressure differential across said pressure responsive main valve member whereby said pressure responsive main valve member is opened to permit flow from said inlet passage to said outlet passage.

In another aspect, the valve assembly of the invention is arranged so that the distance said pressure responsive main valve member moves from a closed position to an open position is greater than the distance said pilot valve member moves from its closed to open position. The distance the main valve moves is limited only by its designed stroke capability while the pilot actuator is designed to provide minimal operational travel and force requirements.

In still another aspect, the present invention provides that said pilot valve member, said pressure responsive main valve member, and said main valve seating surface are co-axial.

DESCRIPTION OF THE DRAWINGS

In the drawings which are appended hereto and made a part of this disclosure.

DETAILED DESCRIPTION OF BEST MODE

Figure 1:
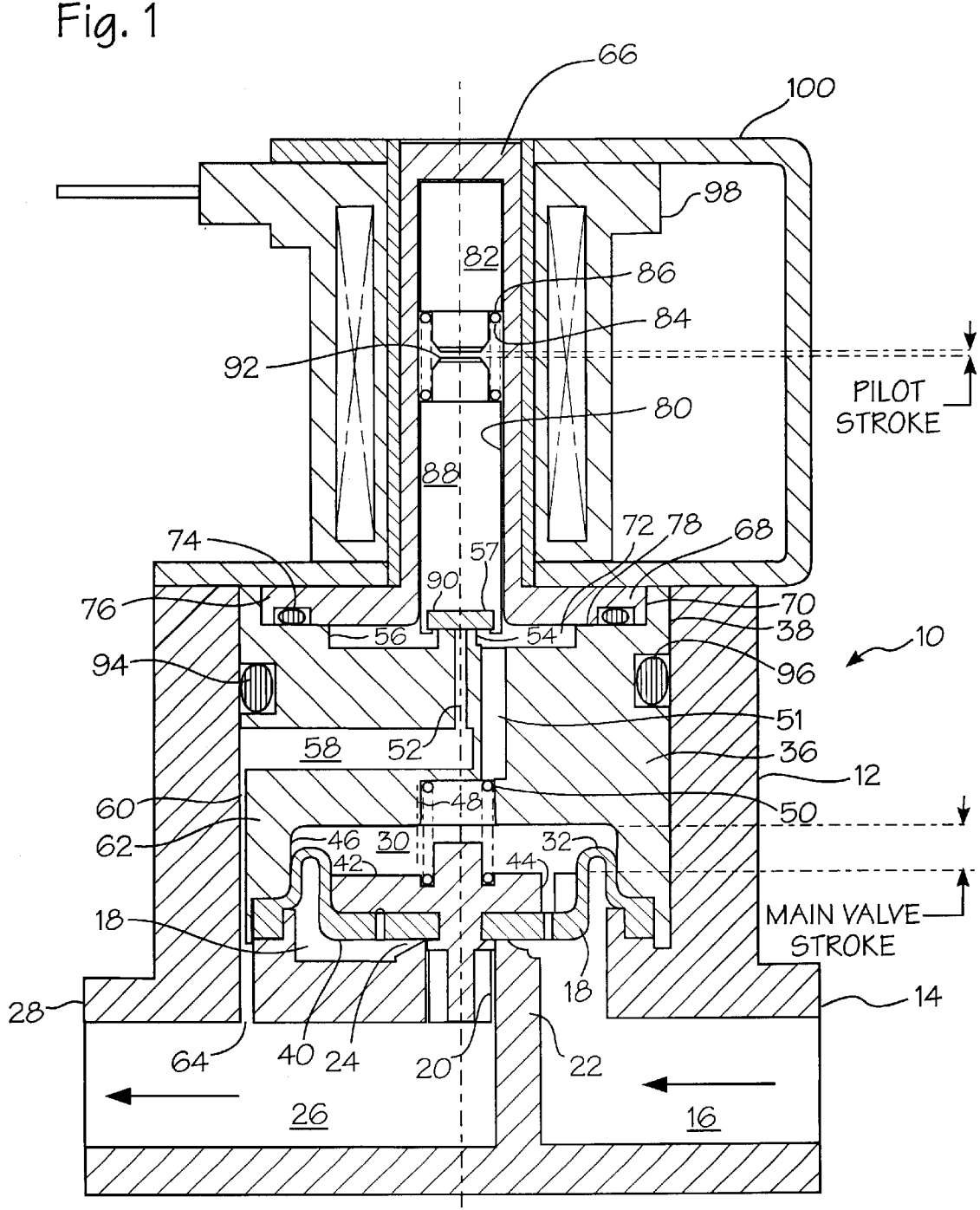
FIG. 1 is a cross-section elevation view of the valve assembly of the present invention.

Referring to FIG. 1, the valve assembly of the present invention indicated generally at 10 employs a housing 12 having a main valve chamber 18 which communicates with passage 16 to inlet 14. An outlet bore 20 is formed in boss 22 extending into chamber 18 and terminates in valve seat 24. Outlet bore 20 communicates with outlet passage 26 to permit fluid flow to outlet 28 when valve 10 is energized and open.

Insert 36 received within bore 38 of housing 12 forms a pilot chamber 30 with flexible diaphragm 32 and bore 46. Pilot chamber 30 is separated from chamber 18 by flexible diaphragm member 32 which has a main valve member 40 for movably contacting valve seat 24. Valve member 40, comprising the central portion of flexible diaphragm 32 has received therethrough an insert 42 which extends into bore 20 for sliding engagement with the wall thereof to thus act as a guide for movement of valve member 40. Flexible diaphragm member 32 is provided with a pilot passage 44 therethrough to provide pressure equalization between chamber 18 and pilot chamber 30 thus causing valve member 40 to contact seat 24 under the pressure differential force across valve members 40, 42 and the assisting force of spring 50 to prevent fluid flow from inlet passage 16 to outlet passage 26 when valve 10 is de-energized. Passage 44 is also of such size to create a sufficient pressure drop between chamber 18 and pilot chamber 30 to cause a force across diaphragm 32 to move valve member 40 from seat 24 to permit flow from inlet passage 16 to outlet passage 26 when valve 10 is energized. Bore 46 of chamber 30 also communicates with bore 48 which is used to locate spring 50 to bias diaphragm 32 to close against its seat 24. A pilot passage 51 communicates bore 48 and pilot chamber 30 with a bore 56. A pilot passage 52 is formed in boss 54 extending into bore 56 and forming a pilot valve seat 57. Passage 58, extends from pilot passage 52 to the outer cylindrical surface 60 of insert 36. Insert 36 is positioned within bore 38 of housing 12, to form a clearance passage 62 between bore 38 and cylindrical surface 60. Passage 64 in housing 12 communicates clearance passage 62 with outlet passage 26 to permit a pilot flow to outlet passage 26.

A tubular guide member 66, closed at one end and at its opposite end has a flanged end 68 disposed within bore 70 of insert 36 to form chamber 72. A seal gasket 74 within gasket groove 76 formed in the flanged end of guide member 66 provides a fluid seal between seal surface 78 of insert 36 and flange member 68. The guide member 66 has positioned in its bore 80, a pole piece 82 of ferromagnetic material fixedly fastened at the closed end of member 66, a spring 84 engaged on a shoulder 86 formed on pole piece 82, and a pilot valve actuator 88 with a shoulder formed thereon to receive the opposite end of spring 84. An elastomer disk seal 90 is fastened to actuator 88 which is biased by spring 84 to force seal 90 to contact seat 57 to thereby close pilot passage 52 and prevent pilot and main valve flow from inlet passage 16 to outlet passage 26. Actuator 88 in its biased position is spaced apart from pole piece 82 to form an air gap 92. Ring seal 94 forms a fluid seal between bore 38 of housing 12 and the groove 96 of insert 36 to prevent external fluid leakage. A suitable coil assembly 98 and its accompanying ferromagnetic frame 100 are located over guide member 66 to provide an electromagnetic actuation means or solenoid means to operate actuator 88. Suitable fasteners (not shown but known to those skilled in the art) fasten frame 100 to housing 12 to retain and secure all parts making up the valve assembly.

Referring again to FIG. 1, operation of the valve of the invention is as follows: when electrical current is applied to coil 98, an electromagnetic force is generated to cause actuator 88 to move and close the small air gap 92 and uncover the seat 57 to allow the passage of pilot fluid starting at inlet 16, through pilot passage 44 into pilot chamber 30, through bore 48, passages 51, 52, and 58, into the passage 62 formed between housing 12 and insert 36 and then through passage 64 to outlet passage 26. The passage of the pilot fluid as described creates a pressure drop across passage 44 and therefore an upward force across diaphragm 32 to move valve member 40 from its seat 24 and thereby allow main valve flow from inlet passage 16 to outlet passage 26. De-energization of coil 98 removes the magnetization force of actuator 88 and allows spring 84 to move actuator 88 and seal 90 to close seat 57 and thereby prevents pilot flow which in turn removes the pressure drop across passage 44 and the up-force across diaphragm 32 to cause member 40 to close off seat 24 to prevent flow from inlet passage 16 to outlet passage 26.

Figure 2:
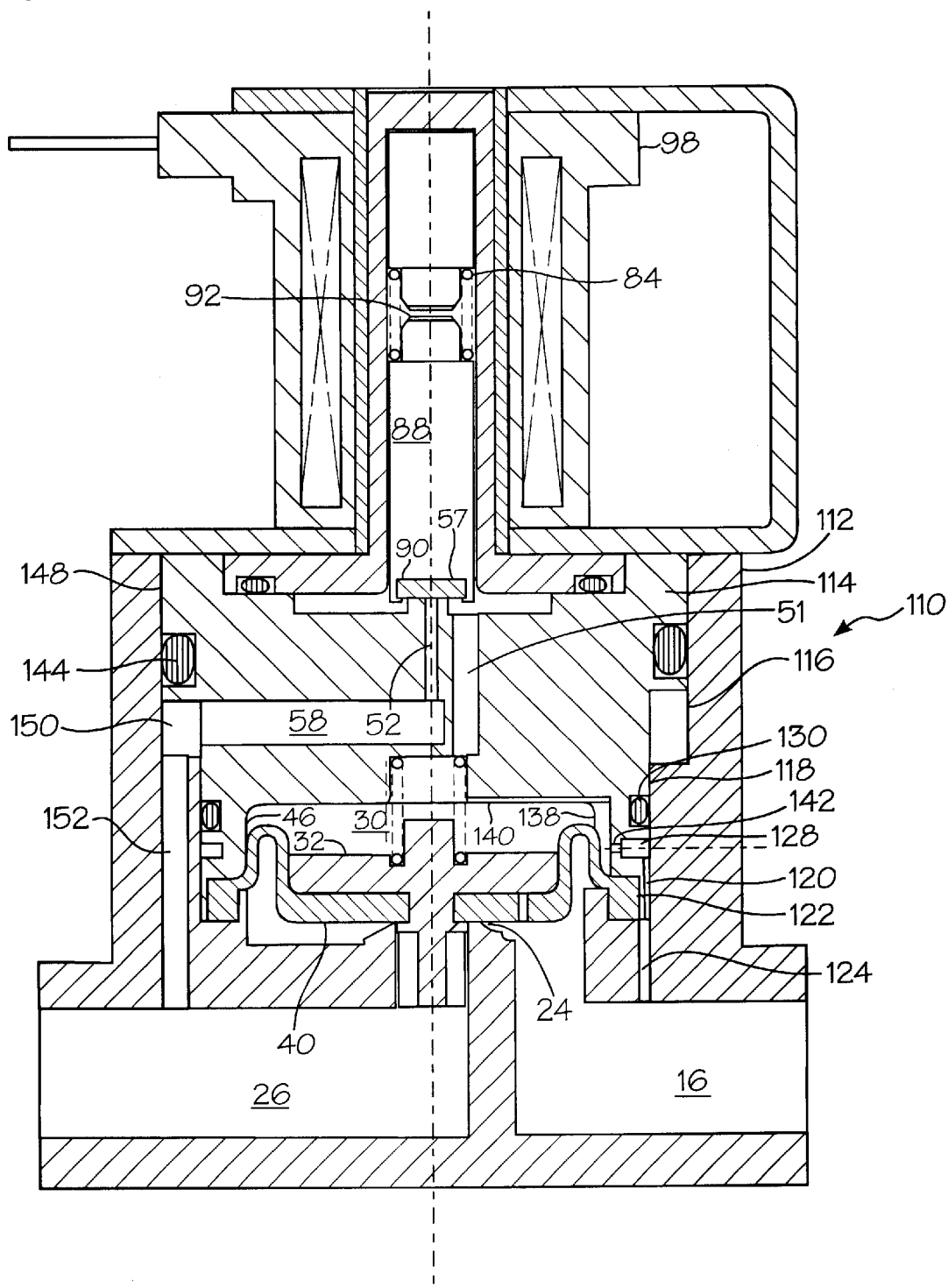
FIG. 2 is a view similar to FIG. 1, illustrating an alternative location of the pilot valve passages; and, FIG. 3 is a cross-section view of a typical prior art commercial version of a pilot operated valve assembly.
Figure 3:
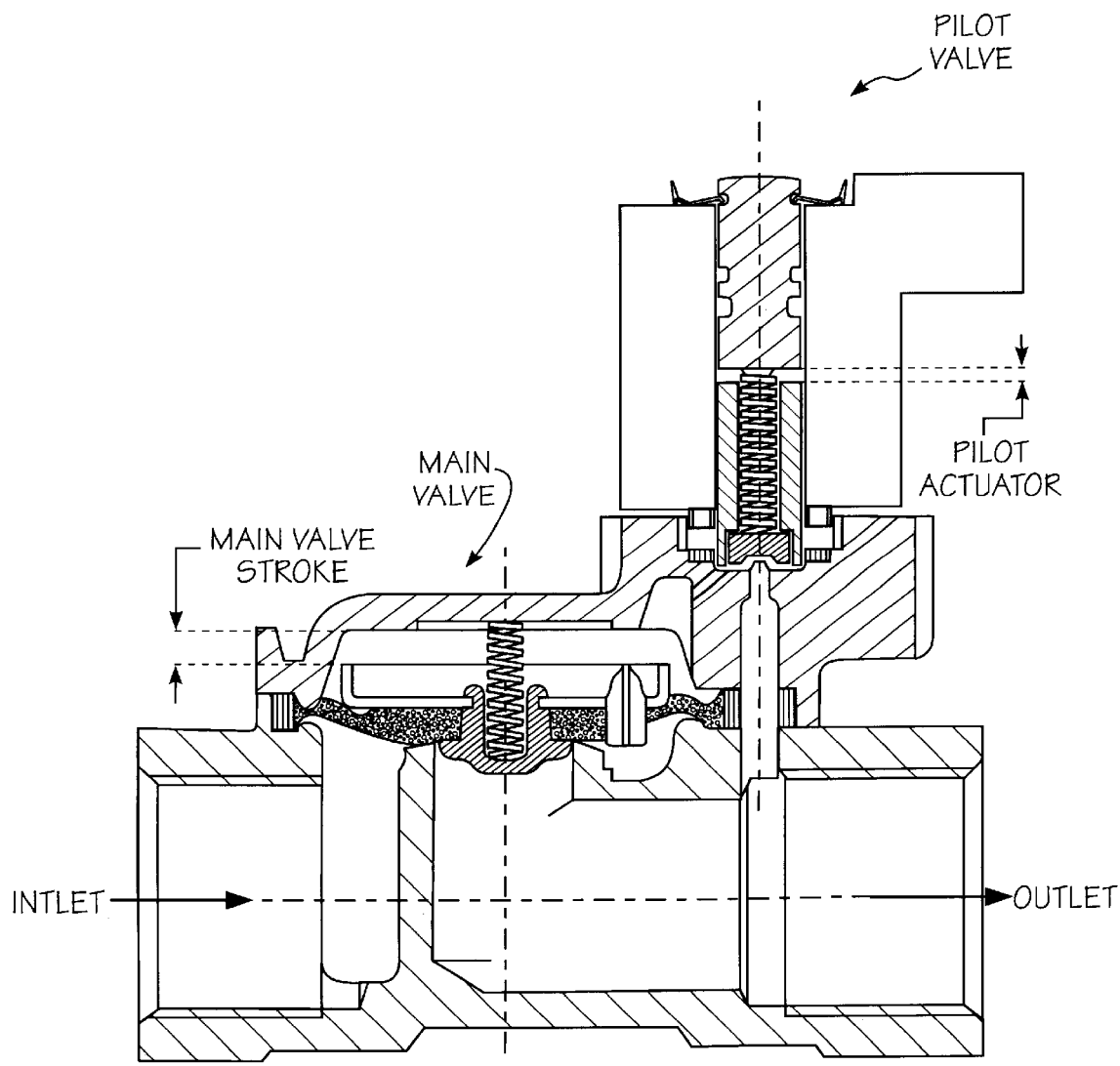

Referring now to FIG. 2 shows another embodiment of the invention indicated generally at 110. Its construction and operation is similar to FIG. 1 but differs mainly in the location of the pilot passage that creates the pressure drop across the diaphragm 32. In FIG. 2, insert 114 is positioned within the bores 116 and 118 of housing 112 with bore 118 forming a clearance passage 120 with diameter 122 of insert 114. A slot passage 124 formed in housing 112 communicates with inlet passage 16, clearance passage 120 and annular groove 128 formed at the diameter 122 of the insert 114 to communicate a radial passage 130 to intersect longitudinal slot 138 in the wall of bore 46 of pilot chamber 30. Slot 138 is joined with radial slot 140 at the end of bore 46 of insert 114 to prevent closure of passage 130 by diaphragm 32 and permit communication of passage 130 to pilot chamber 30. A seal ring 142 provides a seal between housing 112 and insert 114 to seal clearance space 120 from bore 116. Seal ring 144 provides a seal between bore 116 of housing 112 and diameter 148 of insert 114 to prevent external fluid leakage. An annular passage 150 formed by the difference of respective diameters 148 and 122 of insert 114 and bores 116 and 118 of housing 112 communicates with passage 152 and outlet passage 26 of housing 112. Other structural members are identical to those described in FIG. 1 and are therefore not repeated herein.

Still referring to FIG. 2, operation of the valve of this embodiment is as follows: When electrical power is applied to coil 98, an electromagnetic force is generated to cause actuator 88 to move and close the small air gap 92 whereby seal 90 uncovers the seat 57 to allow the passage of pilot fluid from inlet passage 16, through passage 124, into the clearance passage 120, annular groove 128, through passage 130 to pilot chamber 30, to passage 51, opened seat 57, through passage 52, 58, 150, and 152 and to the outlet passage 26. The passage of the pilot fluid, as described, creates a sufficient pressure drop from inlet passage 16 to pilot chamber 30 to create an upward force across diaphragm 32 to move valve member 40 from its seat 24 and thereby allow main valve flow from inlet passage 16 to outlet passage 26. De-energization of coil 98 removes the magnetizing force of actuator 88 to close pilot seat 57 and thereby prevents pilot flow and removes the upward force across diaphragm 32 to close off seat 24 and to stop flow from inlet passage 16 to outlet passage 26.

In a preferred embodiment example of a water valve having a 0.5 to 4.0 GPM range, a pilot valve seat diameter of approximately 0.030 inches and a travel of 0.015 to 0.020 inches will satisfactorily operate with a main valve seat diameter of 0.300 inches and with a pressure responsive main valve member actuation travel to 0.200 inches. These values are determined primarily on valve pressure drop versus flow, practical size, actuation force available, and cost requirements. In general, there is no specific required relationship between pilot valve size and the size of the pressure responsive main valve member and therefore, size of main and pilot members can vary over an extremely large range.

Although my invention has been described above with respect to preferred embodiments and the best mode presently known, modification and variations of my invention will be apparent to those having ordinary skill in the art after having read and understood the foregoing. Therefore, my invention is limited only by the following claims.

I claim:

1. A pilot operated pressure actuated valve assembly comprising:
   a) a housing having a main fluid passage with inlet and outlet passages;
   b) a main valve seating surface within said housing located between said inlet and outlet passages;
   c) a pressure responsive main valve member movable with respect to the housing from a closed position contacting said seating surface to an open position spaced apart from said seating surface to permit flow from the inlet to the outlet passage;
   d) an insert disposed within said housing, the space between said pressure responsive main valve member and said insert defining a pilot chamber in said insert, said insert having pilot passages therein communicating said inlet, said pilot chamber, and said outlet;
   e) means for biasing said pressure responsive main valve member to the closed position;
   f) means defining a pilot flow passage to permit flow from said inlet passage to said outlet passage;
   g) a pilot valve member movable between a closed position preventing fluid flow through said pilot flow passage and an open position permitting flow therethrough;
   h) means for biasing said pilot valve member to a closed position; and,
   i) means for moving said pilot valve member from the closed to the open position to permit fluid to flow through said pilot flow passage thereby causing a pressure differential across said pressure responsive main valve member whereby said pressure responsive main valve member is opened to permit flow from said inlet passage to said outlet passage.

2. The valve assembly of claim 1 wherein a portion of said pilot passage is formed by an annular passage between said housing and said insert.

3. The valve assembly of claim 1 wherein said insert, said pilot valve member, said pressure responsive main valve member, and said main valve seating surface are co-axial.

4. The valve assembly of claim 1 wherein said means for moving said pilot valve member is by an electromagnetic means.

5. The valve assembly of claim 1 wherein said means defining a pilot flow passage permits flow from said pilot chamber to said outlet and from said inlet to said pilot chamber.

6. The valve assembly of claim 1 wherein said fluid passages are formed substantially perpendicular or parallel to a plane perpendicular to diametral axis of said main valve seat.

7. A pilot operated pressure actuated valve assembly comprising:
   a) a housing means having a main fluid passage with inlet and outlet passages and including a main valve seating surface located between the inlet and outlet passages;
   b) a pressure responsive main valve member movable with respect to housing means between a closed position contacting said seating surface and an open position spaced from said seating surface to permit flow from said inlet to said outlet;
   c) an insert disposed within said housing, said insert having a cavity between said insert and said pressure responsive main valve member, the cavity therebetween defining a pilot chamber, said insert containing pilot passages to permit flow from said inlet, to said pilot chamber, and from said pilot chamber to said outlet;
   d) means for biasing said pressure responsive main valve member toward a closed position;
   e) means defining a pilot passage across said main valve member;
   f) means defining a pilot flow passage to permit flow from said inlet passage to said outlet passage, said pilot passage including a passage leading through said insert and communicating said inlet passage with said pilot chamber, and a passage permitting pilot flow from said pilot chamber to said outlet;
   g) a pilot valve member movable between a closed position preventing fluid flow through said pilot flow passage and an open position permitting flow therethrough;
   h) means biasing said pilot valve member to a closed position; and,
   i) means for moving said pilot valve member from the closed to the open position to permit flow through said pilot flow passage to thereby cause a pressure differential across said pressure responsive main valve member whereby said pressure responsive main valve member is opened to permit flow from said inlet passage to said outlet passage.

8. The valve assembly of claim 7 wherein a portion of said pilot passage is defined by an annular passage between said housing and said insert.

9. The valve assembly of claim 7 wherein said insert, said pilot valve member, said main valve member, and said main valve seating surface are co-axial.

10. The valve assembly of claim 7 wherein said means for actuating said pilot valve member is electromagnetic.

11. The valve assembly of claim 7 wherein means to bias said pilot valve member to a closed position is a spring member, and means to bias said pressure responsive main valve member to a closed position is another spring member.

12. A pilot operated pressure valve actuated assembly comprising:
   a) a housing having a cavity in communication with an inlet and outlet chamber formed at each end thereof;
   b) a boss separating said inlet and outlet chambers and forming a main valve seat located substantially in the center of said housing;
   c) a cylindrical insert having opposed inner and outer ends disposed within the cavity of said housing, said insert having control passages, a pilot valve seat, and pilot chamber formed therein, said pilot valve seat being centered in the outer end of said insert and the pilot chamber being centered in the opposite end of said insert;
   d) a diaphragm configured pressure responsive main valve member sandwiched between said housing and said insert said diaphragm covering said pilot chamber and aligned to move to a shut-off position upon main valve seat; and,
   e) an electromagnetically operated pilot valve closing the open end of said housing, said pilot valve being positioned to move from open and closed position with respect to said pilot valve seat permitting said pilot valve member movement to being less than that of said main valve, and said control passage connecting the inlet and outlet chambers through said pilot valve whereby when the pilot valve is opened pressure in the pilot chamber is lowered causing the main valve to move towards said pilot chamber and open the main valve.

13. A pilot operated pressure actuated valve assembly comprising:
   a) a housing having a main fluid passage with inlet and outlet passages;
   b) a main valve seating surface within said housing located between said inlet and outlet passages;
   c) a pressure responsive main valve member movable with respect to the housing from a closed position contacting said seating surface to an open position spaced apart from said seating surface to permit flow from the inlet to the outlet passage;
   d) an insert disposed within said housing, the space between said pressure responsive main valve member and said insert defining a pilot chamber in said insert, said insert having pilot passages therein communicating said inlet, said pilot chamber, and said outlet;
   e) means for biasing said pressure responsive main valve member to the closed position;
   f) means defining a pilot flow passage for communicating said inlet passage and said outlet passage wherein said pilot flow passage includes a passage leading through said pressure responsive main valve member that operably connects said inlet passage and said pilot chamber;
   g) a pilot valve member movable between a closed position preventing fluid flow through said pilot flow passage and an open position permitting flow therethrough;
   h) means for biasing said pilot valve member to a closed position; and,
   i) means for moving said pilot valve member from the closed to open position to permit fluid to flow through said pilot flow passage thereby causing a pressure differential across said pressure responsive main valve member whereby said pressure responsive main valve member is opened to permit flow from said inlet passage to said outlet passage.

14. A pilot operated pressure actuated valve assembly comprising:
   a) a housing having a main fluid passage with inlet and outlet passages;
   b) a main valve seating surface within said housing located between said inlet and outlet passages;
   c) a pressure responsive main valve member movable with respect to the housing from a closed position contacting said seating surface to an open position spaced apart from said seating surface to permit flow from the inlet to the outlet passage;
   d) an insert disposed within said housing, the space between said pressure responsive main valve member and said insert defining a pilot chamber in said insert, said insert having pilot passages therein communicating said inlet, said pilot chamber, and said outlet;
   e) means for biasing said pressure responsive main valve member to the closed position;
   f) means defining a pilot flow passage for communicating said inlet passage and said outlet passage wherein said pilot flow passage includes a passage leading through said pressure responsive main valve member that operably connects said inlet passage and said pilot chamber;
   g) a pilot valve member movable between a closed position preventing fluid flow through said pilot flow passage and an open position permitting flow therethrough;
   h) means of biasing said pilot valve member to a closed position; and,
   i) means for moving said pilot valve member from the closed to open position to permit fluid to flow through said pilot flow passage thereby causing a pressure differential across said pressure responsive main valve member whereby said pressure responsive main valve member is opened to permit flow from said inlet passage to said outlet passage.

15. A pilot operated pressure actuated valve assembly comprising:
   a) a housing having a main fluid passage with inlet and outlet passages;
   b) a main valve seating surface within said housing located between said inlet and outlet passages;
   c) a pressure responsive main valve member movable with respect to the housing from a closed position contacting said seating surface to an open position spaced apart from said seating surface to permit flow from the inlet to the outlet passage;
   d) an insert disposed within said housing, the space between the pressure responsive main valve member and said insert defining a pilot chamber in said insert, said insert having pilot passages therein communicating said inlet, said pilot chamber, and said outlet;

e) means for biasing said pressure responsive main valve member to the closed position;

f) means defining a pilot flow passage to permit flow from said inlet passage to said outlet passage;

g) a movable pilot valve actuator associated with a stationary pole member, said movable pilot valve actuator having a valve sealing member at one end, said sealing member movable by said pilot valve actuator between a closed position preventing fluid flow through said pilot flow passage and an open position permitting flow therethrough, said pole member and said actuator comprising ferromagnetic material;

h) spring means operably connecting said pole member and the other end of said actuator, said spring means biasing said actuator to close said pilot valve;

i) said actuator, spring means, and pole member being disposed along a common axis with a gap between said pole member and said other end of said actuator, the permitted width of said gap being substantially less than the full open travel of said main valve member; and, j) a coil of electrically conductive material surrounding said pole member and actuator whereby when said coil is energized with an electric current said actuator will move and close said gap causing said seal member to lift and permit fluid flow through said pilot passage thereby causing a pressure differential across said pressure responsive main valve member whereby said pressure responsive main valve member is opened to permit flow from said inlet passage to said outlet passage.

* * * * *

UNITED STATES PATENT AND TRADEMARK OFFICE
CERTIFICATE OF CORRECTION

PATENT NO.    : 6,290,203 B1
DATED         : September 18, 2001
INVENTOR(S)   : Lawrence A. Kolze It is certified that error appears in the above-identified patent and that said Letters Patent is hereby corrected as shown below:

<u>Column 8,</u>
Lines 11-51, claims 13 and 14 are identical and accordingly claim 14 is hereby cancelled.

Signed and Sealed this

Fourteenth Day of May, 2002

Attest:

JAMES E. ROGAN
*Attesting Officer*  *Director of the United States Patent and Trademark Office*